June 4, 1940.    R. S. KLOPFENSTEIN    2,203,159
CULTIVATING TOOL
Filed June 13, 1938
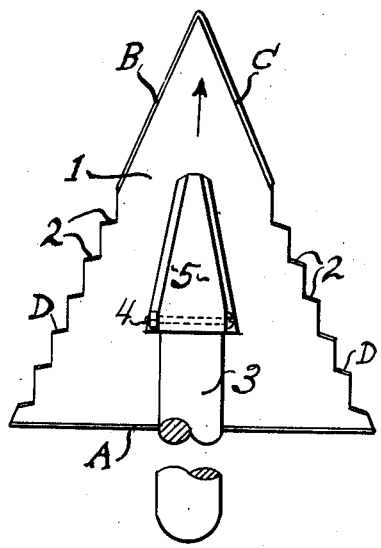
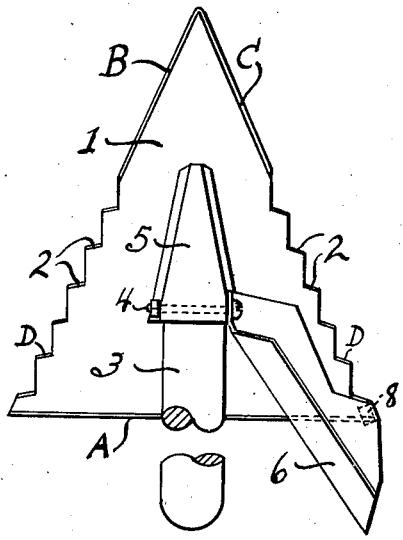
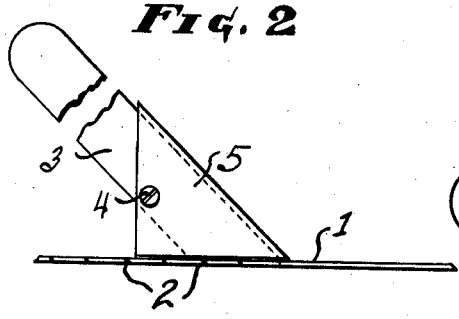
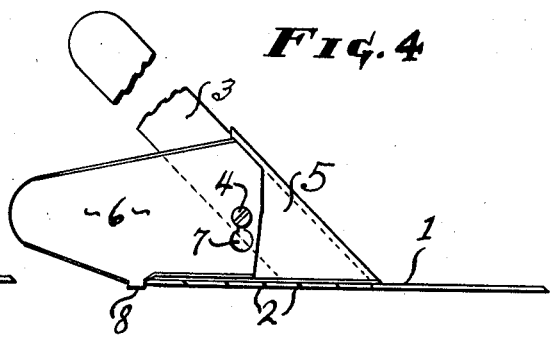
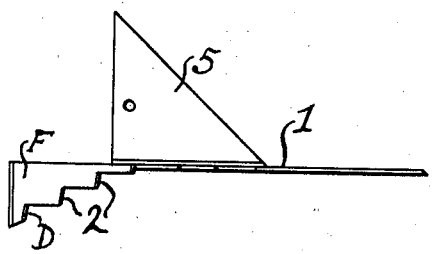
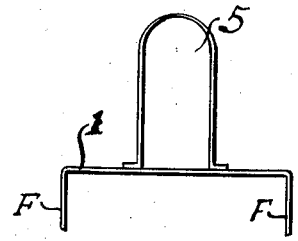
INVENTOR.
ROBERT S. KLOPFENSTEIN
BY U. G. Charles
ATTORNEY.

Patented June 4, 1940

2,203,159

UNITED STATES PATENT OFFICE 2,203,159

CULTIVATING TOOL

Robert S. Klopfenstein, Wichita, Kans.

Application June 13, 1938, Serial No. 213,412

1 Claim. (Cl. 97—68)

This invention relates to improvements in a cultivating tool, and has for its principal object a tool convertible into a side plow operating coincident with the weed cutting blade.

A further object of this invention is to provide a detachable mould board to be carried by the weed cutting blade and operable when said blade is submerged in the ground at proper weed cutting depth.

A still further object of this invention is to provide a blade, the contour of which is triangular in form, two of its sides being of greater length than the other, functioning as cutting edges, the cutting edges arranged in such a way as to avoid collection of fibrous roots or the like, while the tool is operated.

These and other objects will hereinafter be more fully explained, reference being had to the accompanying drawing forming a part of this specification, and in which like characters will apply to like parts in the different views.

Referring to the drawing:

Fig. 1 is a plan view of the tool, the handle fragmentarily shown.

Fig. 2 is a side view of Fig. 1.

Fig. 3 is a plan view of the tool having a mould board attached thereto.

Fig. 4 is a side view of Fig. 3.

Fig. 5 is a side view of the tool, showing a modification of the blade with respect to elements to avoid lateral movement from the operating line of movement, the handle being removed.

Fig. 6 is a rear view of Fig. 5.

My invention herein disclosed consists of a blade 1 triangular in form, the rear side of the angle as at A being shorter than the sides B and C. The last said sides each have a plurality of serrations 2 spaced therealong; the cutting edge of each as at D is slantingly positioned rearward and outward with respect to the longitudinal axis of said blade, and being so positioned facilitates less resistance in cutting weeds or the like when the tool is moved along the surface of the ground in direction with its longitudinal axis, as being conducted by a handle 3, moving the tool in the direction indicated by the arrow in Fig. 1. The said handle is secured by a bolt 4 in a socket 5 that is medially located and integrally joined to the said blade portion.

Detachably arranged and carried by the tool is a mould board 6 that is secured to the tool through the medium of bolt 4 passing through an aperture 7 in the mould board, said aperture having a reduced offset to fit snugly on the shaft of the bolt when moved downward to engagement therewith. The outer end portion of said mould board is secured to the blade by lip 8 turned back on itself to engage on the underside of said blade, by which means the said mould board is firmly supported obliquely extending rearward and outward as shown in Fig. 3. The mould board, being thus attached, is a means to turn the earth as gathered on the blade by advanced movement thereof beneath the surface of the ground, likewise in cultivating row crops, hilling the same and covering weed growths that may be growing along said row crop.

When it is desired to kill the growth of weeds or the like that exist between the rows of the crop, I preferably remove the mould board and convey the blade of the tool a preferred depth below the surface of the ground, so that the serrated edge portion thereof will sever the weed growth as the tool passes therethrough, it being understood that the surface of the ground is pulverized while the stubs of the weed are practically covered by loose ground as the tool moves forward.

Excess side movement of the tool is avoided through the medium of the serrations, the tendency of which is to saw the stocks of the large growths and at the same time avoid collection of the fibre or become entangled with the smaller growth as the cutting edges of the said serrated portions slant rearward and outward for smooth clean cutting as the tool is conveyed.

It will be seen that a portion of each edge extending rearward from the apex of the blade is sharp and unserrated as means to penetrate the earth more readily.

The rear edge of the blade as at A is brought to a cutting edge but unserrated for digging and cutting purposes as by a standard hoe, and the points of the tool are convenient to work among congested growths. The blade, being made of a single piece and in one solid sheet, will result in a convenience to raise and lower the forward point governing the desired depth to run the tool beneath the surface of the ground.

In Figs. 5 and 6, I have illustrated a modification whereby each rear corner of the blade is turned downward at right angles and in parallelism with each other as shown as at F, the purpose of which is to penetrate the earth to avoid lateral movement of the tool as conveyed forward, and the downward extension may be varied by removing a portion at their lower extremity, and such other modification may be made as lie within the scope of the appended claim.

Having fully described my invention what I claim as new and desire to secure by Letters Patent is:

In a cultivating tool, a tool comprising a solid blade body and a socket medially secured to one side of the blade, said blade being triangular in contour, so that two of its edges meet, forming a point for advanced penetration of the blade as moved, each edge extending rearward and outward from the body of the blade and having a plurality of serrations spaced therealong, each of which have a cutting edge, the cutting edges slantingly positioned rearward and outward from their respective edges of the blades, and a handle, one end of which is secured in the socket by a bolt, a mould board apertured, the aperture to be engaged by the bolt, and a lip integrally joined to the mould board and turned back on itself to engage the blade as anchoring means thereto.

ROBERT S. KLOPFENSTEIN.